Sept. 11, 1923.                                                1,467,436
J. P. KRAMER
WATER COOLER
Filed Sept. 23, 1922
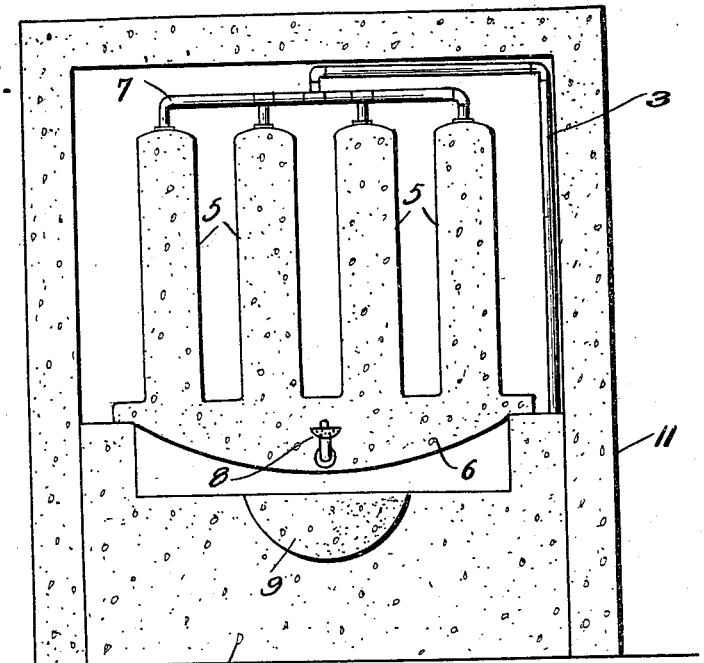
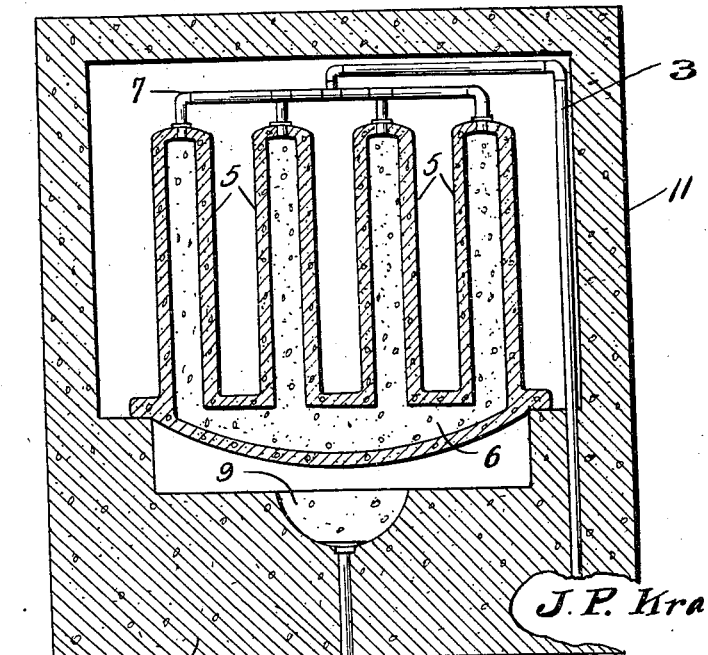
Inventor
J. P. Kramer.
By
Attorney Patented Sept. 11, 1923.

1,467,436

UNITED STATES PATENT OFFICE.

JOSEPH PETER KRAMER, OF MADERA, CALIFORNIA.

WATER COOLER.

Application filed September 23, 1922. Serial No. 590,087.

*To all whom it may concern:*

Be it known that I, JOSEPH PETER KRAMER, a citizen of the United States, residing at Madera, in the county of Madera and State of California, have invented certain new and useful Improvements in Water Coolers; and I do hereby declare the following to be a full, clear, and exact description of the invention, such as will enable others skilled in the art to which it appertains to make and use the same.

It is well known that evaporation materially reduces the temperature of water and advantage is taken of this principle in the present invention, which provides a water container of porous material, such as concrete, earthenware or analogous material which will admit of the seeping of water therethrough which when reaching the surface evaporates, thereby reducing the temperature of the container and the water therein.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a front view of a water cooler embodying the invention, and

Figure 2 a vertical longitudinal section thereof.

Corresponding and like parts are referred to in the following description and designated in both views of the drawing by like reference characters.

The cooler comprises a plurality of containers 5. Each of the containers 5 is relatively tall, wide and thin, so that the side walls are spaced apart a short distance. The walls of the container are porous to admit of water seeping therethrough and evaporating upon reaching the surface with the result that the temperature of said walls is materially reduced and by reason of the narrow space 2, the water contained therein is likewise cooled to approximately the temperature of the walls of the container. The container may be constructed of concrete, earthenware or other material which will admit of the water seeping therethrough and it is essential that the space between opposite side walls be relatively narrow to insure a cooling of the water. A pipe 3 supplies water to the containers and the latter are at all times filled to their utmost capacity and the pressure of the water may serve to hasten the seeping of the water through the walls of the containers. A faucet 8 connects with the lower portion of the containers for drawing off the water therefrom. It is preferred to have the supply pipe 3 connect with the top of the containers.

The containers 5 are in communication at their lower ends with a chamber 6 and are spaced apart a short distance. The faucet 8 is applied to the lowest part of the chamber 6.

The containers 5 and chamber 6 are formed of a suitable porous material which will admit of the seepage of water therethrough. A branch pipe 7 is connected with the pipe 3 and supplies water to each of the containers 5. A catch basin 9 is disposed to receive the waste water from the faucet 8. The fountain is mounted upon a base 10 of concrete, masonry or other material and a suitable frame 11 protects the structure and affords a finish thereto and extends over and along opposite sides of the containers 5 and chamber 6.

What is claimed is:

1. A water cooler comprising a chamber and a plurality of containers mounted side by side upon said chamber and in communication therewith, each container being relatively tall, wide and thin so that the space comprised between opposite side walls is relatively narrow, said containers being constructed of porous material which admits of the seepage of water therethrough which upon evaporating at the surface acts to cool the container and the water therein.

2. A water cooler comprising a chamber and a plurality of containers mounted side by side upon said chamber and in communication therewith, both the chamber and containers being formed of porous material, a base having the chamber and containers mounted thereon and provided with a basin to receive the waste water, and a frame extending over and along opposite sides of the containers, chamber and base.

In testimony whereof I affix my signature in presence of two witnesses.

JOSEPH PETER KRAMER.

Witnesses:
 AMANDA ROTHGANGEL,
 JOHN W. MALOY.